US011875809B2

(12) United States Patent
Song et al.

(10) Patent No.: US 11,875,809 B2
(45) Date of Patent: Jan. 16, 2024

(54) SPEECH DENOISING VIA DISCRETE REPRESENTATION LEARNING

(71) Applicant: Baidu USA, LLC, Sunnyvale, CA (US)

(72) Inventors: Zhao Song, Sunnyvale, CA (US); Wei Ping, Sunnyvale, CA (US)

(73) Assignee: Baidu USA LLC, Sunnyvale, CA (US)

(*) Notice: Subject to any disclaimer, the term of this patent is extended or adjusted under 35 U.S.C. 154(b) by 265 days.

(21) Appl. No.: 17/061,317

(22) Filed: Oct. 1, 2020

(65) Prior Publication Data
US 2022/0108712 A1 Apr. 7, 2022

(51) Int. Cl.
G10L 21/0208 (2013.01)
G10L 25/30 (2013.01)
G06N 3/045 (2023.01)
G06N 3/08 (2023.01)

(52) U.S. Cl.
CPC .......... G10L 21/0208 (2013.01); G06N 3/045 (2023.01); G10L 25/30 (2013.01)

(58) Field of Classification Search
CPC ....... G10L 19/008; G10L 19/02; G10L 19/00; G10L 19/005; G10L 19/0208; G10L 21/0208; G10L 25/30; G10L 15/16; G10L 15/20; G06N 3/0454; G06N 3/0472; G06N 3/08; G06N 3/04; G06N 5/003; G06N 5/00; H04N 19/107
USPC ..... 704/226, 230, 233, 238, 239, 240, 1–10, 704/270, 270.1, 272; 706/10, 12, 13, 15, 706/16, 25, 41, 42, 43
See application file for complete search history.

(56) References Cited

U.S. PATENT DOCUMENTS 10,068,557 B1* 9/2018 Engel .................... G10H 1/0041
2019/0130903 A1* 5/2019 Sriram .................... G10L 15/20
2020/0211580 A1* 7/2020 Lee ..................... G10L 21/0216

OTHER PUBLICATIONS

Kamper et al., "A segmental framework for fully-unsupervised large-vocabulary speech recognition," arXiv preprint arXiv:1606.06950, 2017. (15pgs).

Chung et al., "Learning word embeddings from speech," arXiv preprint arXiv:1711.01515, 2017. (6pgs).

Lample et al., "Unsupervised Machine Translation Using Monolingual Corpora Only," in Proc. International Conference on Learning Representations, 2018. (14pgs).

(Continued)

*Primary Examiner* — Leshui Zhang
(74) *Attorney, Agent, or Firm* — North Weber & Baugh LLP

(57) ABSTRACT

Developed and presented herein are embodiments of a new end-to-end approach for audio denoising, from a synthesis perspective. Instead of explicitly modelling the noise component in the input signal, embodiments directly synthesize the denoised audio from a generative model (or vocoder), as in text-to-speech systems. In one or more embodiments, to generate the phonetic contents for the autoregressive generative model, it is learned via a variational autoencoder with discrete latent representations. Furthermore, in one or more embodiments, a new matching loss is presented for the denoising purpose, which is masked on when the corresponding latent codes differ. As compared against other method on test datasets, embodiments achieve competitive performance and can be trained from scratch.

20 Claims, 6 Drawing Sheets

(56) References Cited

OTHER PUBLICATIONS

Chung et al., "Unsupervised crossmodal alignment of speech and text embedding spaces," arXiv preprint arXiv: 1805.07467, 2018. (11pgs).
Jansen et al., "Efficient spoken term discovery using randomized algorithms," in Proc. Automatic Speech Recognition and Understanding Workshop (ASRU), 2011. (6pgs).
Dunbar et al., "The Zero Resource Speech Challenge 2019: TTS without T," arXiv preprint arXiv:1904.11469, 2019. (5pgs).
Hinton & Salakhutdinov, "Reducing the dimensionality of data with neural networks," Science, vol. 313, No. 5786, 2006. (4pgs).
Vincent et al., "Extracting and composing robust features with denoising autoencoders," in Proc. International Conference on Machine Learning, 2008. (8pgs).
Krizhevsky et al., "ImageNet classification with deep convolutional neural networks," In Advances in Neural Information Processing Systems, 2012. (7pgs).
Szegedy et al., "Going deeper with convolutions," in Proc. IEEE Conference on Computer Vision and Pattern Recognition, 2015. (9pgs).
Bahdanau et al., "Neural machine translation by jointly learning to align and translate," in Proc. International Conference on Learning Representations, 2015. (9pgs).
Wu et al., "Google's neural machine translation system: Bridging the gap between human and machine translation," arXiv preprint arXiv:1609.08144, 2016. (23pgs).
C.-C.Chiu et al., "State-of-the-art speech recognition with sequenceto-sequence models," arXiv preprint arXiv:1712.01769v6 [cs.CL] Feb. 23, 2018. (5pgs).
Wang et al., "Gated self-matching networks for reading comprehension and question answering,"in Proc. 55th Annual Meeting of the Association for Computational Linguistics, (vol. 1: Long Papers), vol. 1, 2017, pp. 189-198. (10pgs).
Wiskott et al.,"Slow feature analysis: Unsupervised learning of invariances," Neural Computation, vol. 14, No. 4, 2002. (56 pgs).
Bowman et al.,"Generating sentences from a continuous space," in SIGNLL Conference on Computational Natural Language Learning, 2016. (12pgs).
Srivastava et al., "Dropout: A simple way to prevent neural networks from overfitting," Journal of Machine Learning Research, vol. 15, No. 1, 2014. (30 pgs).
Krueger et al., "Zoneout: Regularizing RNNs by randomly preserving hidden activations," in Proc. International Conference on Learning Representations, 2017.(11 pgs).
Kingma et al.,"Adam: A method for stochastic optimization," arXiv preprint arXiv:1412.6980, 2014. (9pgs).
Polyak et al.,"Acceleration of stochastic approximation by averaging," SIAM Journal on Control and Optimization, vol. 30, No. 4, pp. 838-855, 1992. (18pgs).
Moyer et al.,"Invariant Representations without Adversarial Training," in Advances in Neural Information Processing Systems, 2018. (10pgs).
Povey et al., "The Kaldi speech recognition toolkit," in Proc. Automatic Speech Recognition and Understanding Workshop (ASRU), 2011. (4pgs).
Schatz et al.,"Evaluating speech features with the minimal-pair ABX task: Analysis of the classical MFC/PLP pipeline," in Proc. Interspeech, 2013. (5pgs).
Hsu et al., "Unsupervised learning of disentangled and interpretable representations from sequential data," arXiv preprint arXiv:1709.07902, 2017. (23pgs).
Li et al., "Disentangled sequential autoencoder," arXiv preprint arXiv:1803.02991, 2018. (12pgs).
Chen et al., "Parallel Inference of Dirichlet Process Gaussian Mixture Models for Unsupervised Acoustic Modeling:A Feasibility Study,"in Proc. Interspeech, 2015.[Abstract](6pgs).
Lee et al.,"A Nonparametric Bayesian Approach to Acoustic Model Discovery," n Proc. 50th Annual Meeting of the Association for Computational Linguistics, 2012. (10pgs).
Ondel et al., "Variational Inference for Acoustic Unit Discovery," Procedia Computer Science, vol. 81, Jan. 2016. (7pgs).
Marxer et al., "Unsupervised Incremental Online Learning and Prediction of Musical Audio Signals," IEEE/ACM Transactions on Audio, Speech, and Language Processing, vol. 24, No. 5, May 2016. (8pgs) [Abstract].
Ebbers et al., "Hidden Markov Model Variational Autoencoder for Acoustic Unit Discovery," in Proc. Interspeech, 2017. (5pgs).
Glarner et al., "Full Bayesian Hidden Markov Model Variational Autoencoder for Acoustic Unit Discovery," in Proc. Interspeech, 2018. (5 pgs).
Park et al., "Unsupervised Pattern Discovery in Speech," IEEE Transactions on Audio, Speech, and Language Processing, vol. 16, 2008. (12 pgs).
van den Oord et al., "WaveNet:A generative model for raw audio," arXiv preprint arXiv:1609.03499, 2016. (15pgs).
van den Oord et al., "Neural discrete representation learning," arXiv preprint arXiv:1711.00937, 2018. (11pgs).
Dunbar et al., "The zero resource speech challenge 2017,"arXiv preprint arXiv:1712.04313, 2017. (10pgs).
Rumelhart et al., "Learning representations by back-propagating errors," Nature, vol. 323, No. 6088, 1986. [Abstract Only] (1pg).
Lee et al., "Sparse deep belief net model for visual area V2," in Advances in Neural Information Processing Systems, 2008. (8pgs).
Dieleman & Schrauwen, "End-to-end learning for music audio," in Proc. International Conference on Acoustics, Speech and Signal Processing (ICASSP), 2014.[Abstract Only] (2pgs).
Jaitly & Hinton, "Learning a better representation of speech soundwaves using restricted Boltzmann machines," in Proc. International Conference on Acoustics, Speech and Signal Processing (ICASSP), 2011. (4pgs).
Palaz et al., "Analysis of CNN-based speech recognition system using raw speech as input," in Proc. Interspeech, 2015. (7pgs).
Olshausen et al.,"Emergence of simple-cell receptive field properties by learning a sparse code for natural images," Nature, vol. 381, No. 6583, p. 607, 1996.(1pg) [Abstract].
Kingma et al.,"Auto-encoding variational bayes," arXiv preprint arXiv:1312.6114v10, 2014. (14pgs).
Higgins et al., "Beta-VAE: Learning basic visual concepts with a constrained variational framework," in Proc. International Conference on Learning Representations, 2017.(22pgs).
Alemi et al., "Deep variational information bottleneck," in Proc. International Conference on Learning Representations, 2019. (19 pgs).
Kingma et al., "Improved variational inference with inverse autoregressive flow," arXiv preprint arXiv:1606.04934, 2017. (16 pgs).
Bengio et al., "Estimating or propagating gradients through stochastic neurons for conditional computation," arXiv preprint arXiv:1308.3432, 2013. (12 pgs).
Jurafsky et al.,"Speech and Language Processing," 2nd Edition, Pearson Prentice-Hall, Inc., 2009. (4pgs).
Dauphin et al., "Language modeling with gated convolutional networks," arXiv preprint arXiv:1612.08083, 2017. (9 pgs).
Bai et al.,"An empirical evaluation of generic convolutional and recurrent networks for sequence modeling," arXiv preprint arXiv:1803.01271, 2018. (14pgs).
Hsu et al., "Hierarchical generative modeling for controllable speech synthesis," arXiv preprint arXiv:1810.07217, 2018. (27pgs).
Heck et al., "Unsupervised linear discriminant analysis for supporting DPGMM clustering in the zero resource scenario," Procedia Computer Science, vol. 81, 2016. (7pgs).
Chen et al., "Multilingual bottleneck feature learning from untranscribed speech," in Proc. Automatic Speech Recognition & Understanding Workshop, 2017. [Abstract Only] (4pgs).
Ansari et al., "Deep learning methods for unsupervised acoustic modeling—leap submission to zerospeech challenge 2017," in Proc. (ASRU), 2017, [online], [Retrieved Oct. 3, 2022]. Retrieved from Internet <URL: https://ieeexplore.ieee.org/abstract/document/8269013> [Abstract] (1pg).
Yuan et al., "Extracting bottleneck features and word-like pairs from untranscribed speech for feature representation," in Proc. ASRU, 2017. (6pgs).

(56) References Cited

OTHER PUBLICATIONS

Shen et al., "Natural TTS synthesis by conditioning WaveNet on mel spectrogram predictions," arXiv preprint arXiv:1712.05884, 2018. (5pgs).

Engel et al., "Neural audio synthesis of musical notes with wavenet autoencoders," arXiv preprint arXiv:1704.01279, 2017. (16pgs).

Ganin et al., "Domain-Adversarial Training of Neural Networks," arXiv preprint arXiv:1505.07818, 2016. (35pgs).

Yu et al.,"QANet: Combining local convolution with global selfattention for reading comprehension," arXiv:1804.09541, 2018. (16pgs).

Zeiler & Fergus, "Visualizing and understanding convolutional networks," arXiv preprint arXiv:1311.2901, 2013. (11pgs).

Sundararajan et al.,"Axiomatic attribution for deep networks," arXiv preprint arXiv:1703.01365, 2017. (11pgs).

Nagamine et al., "Understanding the representation and computation of multilayer perceptrons: A case study in speech recognition," in Proc. International Conference on Machine Learning, 2017. (11pgs).

Chorowski et al.,"On usingbackpropagation for speech texture generation and voice conversion," arXiv preprint arXiv:1712.08363v2 [cs.SD] Mar. 8, 2018. (6pgs).

Swietojanski et al., "Unsupervised cross-lingual knowledge transfer in DNN-based LVCSR," in Proc. Spoken Language Technology Workshop (SLT), 2012. (7pgs).

Thomas et al., "Deep neural network features and semi-supervised training for low resource speech recognition," in Proc. International Conference on Acoustics, Speech and Signal Processing (ICASSP), 2013. (5pgs).

Panayotov et al., "LibriSpeech: an ASR corpus based on public domain audio books," in Proc. International Conference on Acoustics, Speech and Signal Processing (ICASSP), 2015.

Sainath et al., "Learning the speech front-end with raw waveform CLDNNs," in Proc. Interspeech, 2015. (5pgs).

Deng et al., "ImageNet:A Large-Scale Hierarchical Image Database," in Proc. IEEE Conference on Computer Vision and Pattern Recognition, 2009. (9pgs).

Yosinski et al., "How transferable are features in deep neural networks?" arXiv preprint arXiv:1411.1792v1, Nov. 2014. (14pgs).

Vesely et al.,"The language-independent bottleneck features," in Proc. Spoken Language Technology Workshop (SLT), 2012. ( 6pgs).

Yu et al., "Improved bottleneck features using pretrained deep neural networks," in Proc. Interspeech, 2011. (4pgs).

McCann et al., "Learned in translation:Contextualized word vectors," arXiv preprint arXiv:1708.00107, 2017. (11pgs).

Bowman et al.,"A large annotated corpus for learning natural language inference," arXiv preprint arXiv:1508.05326, 2015. (11pgs).

Conneau et al., "Supervised learning of universal sentence representations from natural language inference data," arXiv preprint arXiv: 1705.02364, 2017. (11pgs).

Lee et al., "Learning the parts of objects by non-negative matrix factorization," Nature, vol. 401, No. 6755, p. 788, 1999. (2pgs) [Abstract Only].

Graves et al.,"Speech recognition withdeep recurrent neural networks," arXiv preprint arXiv: 1303.5778, 2013. (5pgs).

Tuske et al.,"Acoustic modeling with deep neural networks using raw time signal for LVCSR," in Proc. Interspeech, 2014. (5pgs).

C. M. Bishop,"Continuous latent variables," in Pattern Recognition and Machine Learning, Springer, Chapter 12, 2006. (66pgs).

Gulrajani et al.,"PixelVAE: A latent variable model for natural images," arXiv preprint arXiv:1611.05013, 2016. (9 pgs).

Schatz et al., "Evaluating speech features with the minimal-pair ABX task (II): Resistance to noise," in Proc. Interspeech, 2014. (5pgs).

Wang et al.,"An 800 bps VQ-based LPC voice coder," The Journal of the Acoustical Society of America, vol. 103, No. 5, 1998. [Abstract] (3pgs).

\* cited by examiner

SPEECH DENOISING VIA DISCRETE REPRESENTATION LEARNING

BACKGROUND

A. Technical Field

The present disclosure relates generally to systems and methods for computer learning that can provide improved computer performance, features, and uses. More particularly, the present disclosure relates to systems and methods denoising audio.

B. Background

Deep neural networks have achieved great successes in many domains, such as computer vision, natural language processing, text-to-speech, among many other applications. One area that receives significant attention is machine learning applications for audio, in particular, speech denoising.

Speech denoising is an important task in audio signal processing, and it has been widely employed in many real-world applications. A goal in speech denoising is to improve the intelligibility of a noisy audio utterance. Classical approaches have focused on employing signal processing techniques, such as filtering and spectral restoration. With the advent of deep learning, neural networks-based approaches have drawn increasing attention, where denoising may be performed in either time or frequency domains to improve the performance, as compared with the classical approaches.

On the other hand, deep generative models have recently emerged as a powerful framework for representation learning and generation tasks for various types of signals, including images, text, and audio. In deep representation learning, variational autoencoders (VAEs) have been shown as an effective tool for extracting latent representations and then facilitating downstream tasks. For audio generation, a neural vocoder has achieved a state-of-the-art performance in generating the raw audio waveforms and has been deployed in real text-to-speech (TTS) systems.

Despite the improvements made by these various approaches, they each have limitations. For example, some of the techniques require explicit computation the loss from the denoised audio to its clean counterpart on the sample level, which can become unstable in certain situations. Of the current neural network approaches, they require separate training of some of the components—thus, there is no end-to-end system that can be trained as one complete system.

Accordingly, what is needed are new approaches that view the denoising issue as a fundamentally different type of problems and overcome the deficiencies of these current methods.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
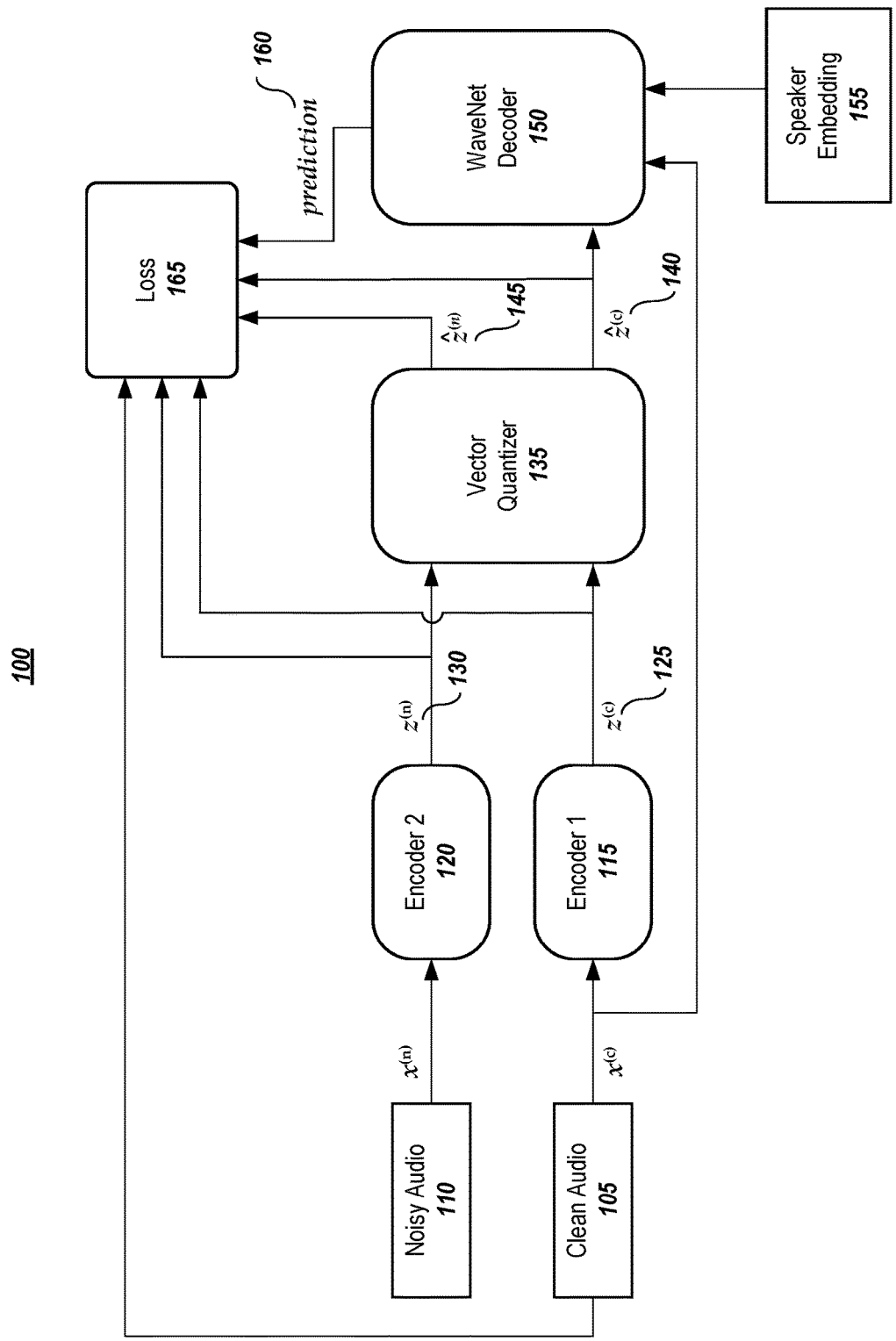
FIG. 1 depicts a denoising system, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

Embodiments herein start with a new perspective by viewing the speech denoising task as a speech generation problem, such as in text-to-speech systems. In one or more embodiments, the denoised audio is generated autoregressively from a vocoder, such as a WaveNet (which is discussed by A. van den Oord, S. Dieleman, H. Zen, K. Simonyan, O. Vinyals, A. Graves, N. Kalchbrenner, A. Senior, and K. Kavukcuoglu in "WaveNet: A Generative Model for Raw Audio," available at arxiv.org/abs/1609.03499v2 (2016), which is incorporated by reference herein in its entirety). This perspective distinguishes embodiments herein from previous methods, as embodiments avoid the need to explicitly compute the loss from the denoised audio to its clean counterpart on the sample level, which could become unstable in the low signal-to-noise ratio (SNR) scenarios. Unlike WaveNet, which uses the mel-spectrogram of the raw audio waveforms as the conditioner, embodiments herein learn the required phonetic information directly from data. More specifically, in one or more embodiments, a vector-quantized variational autoencoder (VQ-VAE) (such as one described by A. van den Oord, O. Vinyals, and K. Kavukcuoglu in "Neural Discrete Representation Learning," in Advances in Neural Information Processing Systems, pages 6306-6315 (2017), which is incorporated by reference herein in its entirety) to generate the discrete latent representations from the cleaned audio, and then use them as the conditioner for a vocoder, such as a WaveNet implementation. In order to achieve the denoising effect, in one or more embodiments, a loss function based on the distance between the clean and noisy continuous latent representations is computed. In one or more embodiments, to improve the robustness, the loss function is further masked on only when the discrete latent codes disagree between the clean and noisy components. In one or more embodiments, system embodiments do not need any pretrained networks, and hence can be trained from scratch.

B. Related Work

Recent progresses have shown that deep generative models could be a useful tool in speech denoising. A generative adversarial network (GAN)-based approach has been proposed, where the generator outputs the denoised audio, and the discriminator classifies it from the clean audio. Others have developed a Bayesian approach by modeling the prior and likelihood functions via WaveNets, each of which needed to be separately trained. Some have employed a non-causal WaveNet to generate the denoised samples, by minimizing regression losses on predicting both clean and noisy components of the input signal. It has been noted that these approaches can perform denoising directly in the time domain, but the noise needs to be explicitly modeled.

Some have proposed a multi-level U-Net architecture to efficiently capture the long-range temporal correlation in the raw waveform, while their focus was on speech separation. Yet other have proposed a new deep feature loss function was proposed to penalize differences of the activations across multiple layers for the clean and denoised audios; however, a pretrained audio classification network is required and hence cannot be trained from scratch. While some have tried a synthesis approach for the denoising task, their approach needed to train two parts sequentially, where the first part needs to predict the clean mel-spectrogram (or other spectral features, depending on the vocoder used), and the second part employed a vocoder to synthesize denoised audios conditioned on the prediction from the first part. In contrast, embodiments herein are end-to-end and can be trained from scratch.

C. Denoising Embodiments

1. Preliminaries

Variational autoencoders (VAEs) have drawn increasing attention recently, as a popular unsupervised learning framework. For example, D. P. Kingma and M. Welling in "Auto-encoding Variational Bayes" (available at arxiv.org/abs/1312.6114 preprint arXiv:1312.6114 (2013)) and D. J. Rezende, S. Mohamed, and D. Wierstra in "Stochastic Backpropagation and Approximate Inference in Deep Generative Models," in International Conference on Machine Learning, pages 1278-1286 (2014), both discuss variational autoencoders (each of which is incorporated by reference herein in its entirety).

In VAEs, an encoder network $q_\theta(z|x)$ corresponds to the distribution of latent representations z given the input data x, parameterized by $\theta$; and a decoder network $p_\phi(x|z)$ computes the likelihood of x from z, parameterized by $\phi$. By defining the prior over the latent representations as p(z), the objective in VAEs may then be to minimize the following loss function:

$$\mathcal{L}_{VAE} = -\mathbb{E}_{q_\theta(z|x)}[\log p_\phi(x|z)] + KL(q_\theta(z|x)\|p(z), \quad (1)$$

where the first term in Eq. (1) may be interpreted as the reconstruction loss, and the second term, a Kullback-Leibler (KL) divergence term, acts as a regularizer to minimize the distance between the posterior $q_\theta(z|x)$ and the prior $p(z)$.

For vector-quantized variational autoencoders (VQ-VAEs), A. van den Oord, O. Vinyals, and K. Kavukcuoglum in "Neural Discrete Representation Learning," in *Advances in Neural Information Processing Systems*, pages 6306-6315 (2017) (which is incorporated by reference herein in its entirety) showed that using discrete latent representations can learn better representations in several unsupervised learning tasks, across different modalities. The encoder in a VQ-VAE embodiment may output discrete codes rather than continuous latent representations, achieved by using vector quantization (VQ), i.e., the discrete latent vector at the $i^{th}$ time step $\hat{z}_i \in \mathbb{R}^M$ may be represented as:

$$\hat{z}_i = C_{i(k)}, \text{ with } i(k) = \arg\min_k \|z_i - C_k\|, \quad (2)$$

where $\{C_1, C_2, \ldots, C_K\}$ correspond to the K learnable codes in the codebook. The decoder then reconstructs the input from the discrete latents $\hat{z}$. In VQ-VAEs, the posterior distribution $q_\theta(\hat{z}|x)$ corresponds to a delta distribution, with the probability mass assigned to only the code returned from the vector quantizer. By assigning a uniform prior $p(z)$ over all discrete codes, it can be shown that the KL divergence term in Eq. (1) reduces to a constant. Subsequently, the loss in the VQ-VAE may be represented as:

$$\mathcal{L}_{VQ-VAE} = -\mathbb{E}_{q_\theta(\hat{z}|x)}[\log p_\phi(x|\hat{z})] + \|sg(z) - C_z\|_2^2 + \gamma \|z - sg(C_z)\|_2^2, \quad (3)$$

where $C_z$ represents the latent codes corresponding to the input $z$; $sg()$ is the stop-gradient operator, which is equal to an identity function in the forward pass and has zero gradient during the backpropagation stage. $\gamma$ in Eq. (3) is a hyperparameter, and in one or more embodiments, it may be set to 0.25.

2. Denoising Via VQ-VAE Embodiments

Presented herein are systems and methods for synthesis approaches in the speech denoising task. FIG. 1 depicts a denoising system, according to embodiments of the present disclosure. As shown in FIG. 1, the depicted embodiment 100 comprises the following components: (i) two residual convnet encoders 115 and 120 with the same or similar architecture, applied to noisy audio input 110 and clean audio input 105, individually; (ii) a vector quantizer 135; and (iii) an autoregressive WaveNet decoder 150, which may be one as described in co-pending and commonly-owned U.S. patent application Ser. No. 16/277,919, filed on 15 Feb. 2020, entitled "SYSTEMS AND METHODS FOR PARALLEL WAVE GENERATION IN END-TO-END TEXT-TO-SPEECH," and listing Wei Ping, Kainan Peng, and Jitong Chen as inventors, which patent document is incorporated by reference herein in its entirety. Also depicted is a loss computation 165, which will be discussed in more detail below with respect to Equation (4).

Figure 2:
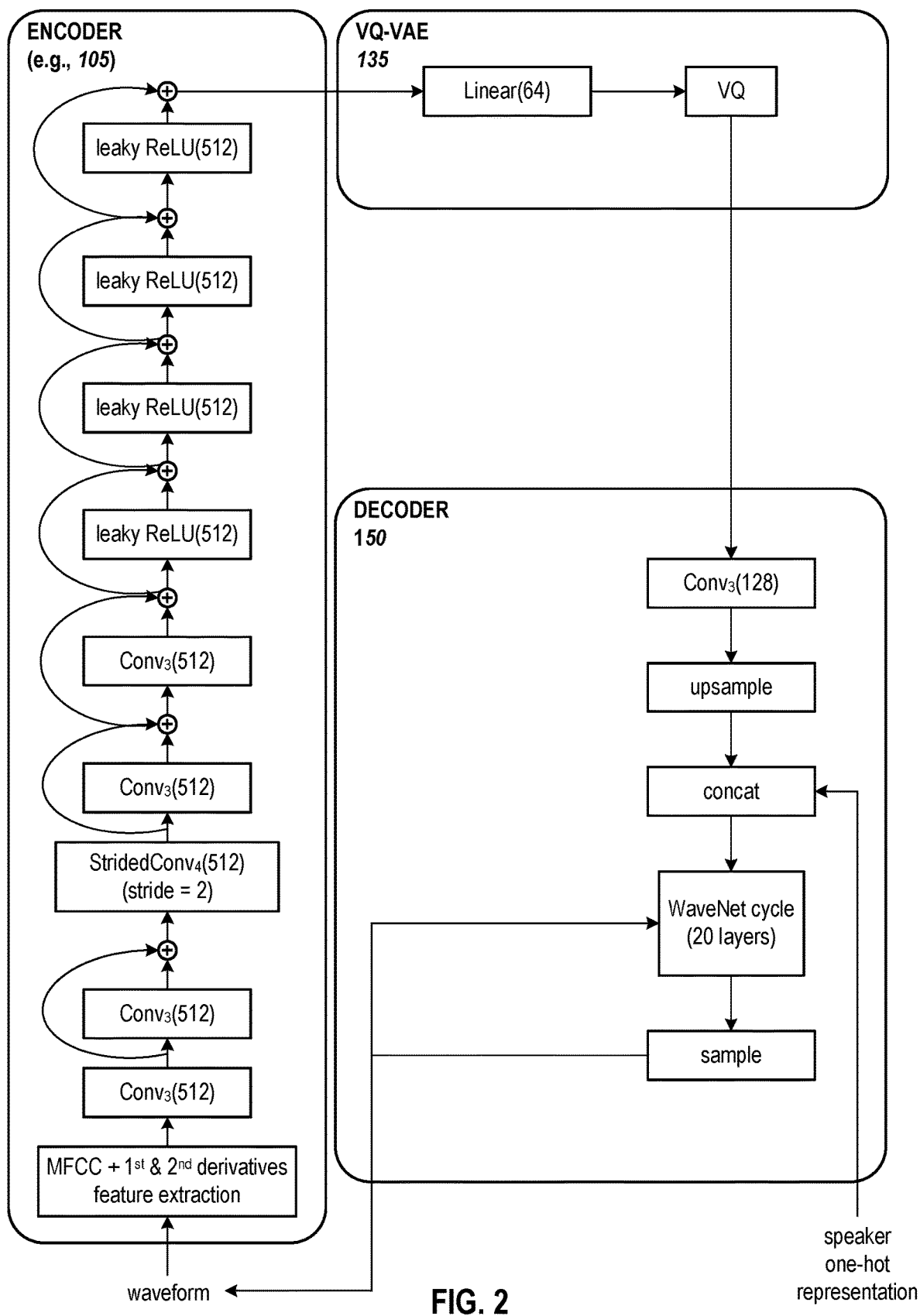
FIG. 2 depicts a view of part of the overall system showing the components and pathway for the clean audio, according to embodiments of the present disclosure.

In one or more embodiments, the architectures for the neural networks may be as follows. FIG. 2 depicts a partial view of the overall system showing the components and pathway for the clean audio, according to embodiments of the present disclosure. FIG. 2 shows the encoder and pathway for the clean audio; the same or similar encoder structure may be used for the noisy audio but it is not depicted due to space constraints.

Encoder (105 and 110). The depicted encoder is similar to the one used in J. Chorowski, R. J. Weiss, S. Bengio and A. van den Oord, "Unsupervised Speech Representation Learning Using WaveNet Autoencoders," in *IEEE/ACM Transactions on Audio, Speech, and Language Processing*, vol. 27, no. 12, pp. 2041-2053, December 2019, doi: 10.1109/TASLP.2019.2938863 (which is incorporated by reference herein in its entirety), except that (i) instead of using a ReLU nonlinearity, the leaky ReLU ($\alpha$=0.2) is used; (ii) the number of output channels is reduced from 768 to 512. Empirical observation suggests that these changes help stabilize optimization and reduce training time, without sacrificing performance.

In one or more embodiments, the raw audio is first converted into standard 13 mel-frequency cepstral coefficient (MFCC) features, along with their first and second derivatives. As illustrated in FIG. 2, the depicted encoder network embodiment may comprise: (i) two residual convolutional layers with filter size 3; (ii) one strided convolutional layer with stride 2 and filter size 4; (iii) two residual convolutional layers with filter size 3; and (iv) four residual fully-connected layers.

Vector Quantizer (135). In one or more embodiments, the output channel number for latent vectors is first reduced to 64, and the codebook contains 512 learnable codes, each of which has a dimension of 64.

Decoder (150). In one or more embodiments, a 20-layer WaveNet is used, with a cross-entropy loss where the number of channels in the softmax layer is set to 2048. Both numbers of residual channels and skip channels may be set to 256. The upsampling of conditioner to the sample level may be implemented via repetitions. In one or more embodiments, the filter size in the convolution layers is set to 3, and a dilated block of $\{1, 2, 4, \ldots, 512\}$ is used, corresponding to a geometric sequence with a common ratio 2.

Returning to FIG. 1, the inputs to the system 100 are the noisy and clean audio pair, denoted as $x^{(n)}$ and $x^{(c)}$, respectively, which comprise the same speech content. As noted above, in one or more embodiments, mel-frequency cepstral coefficient (MFCC) features are first extracted from raw audios, which are then passed through the residual convolutional and fully-connected layers to generate corresponding continuous latent vectors $z^{(n)}$ 130 and $z^{(c)}$ 125. Subsequently, the vector quantization introduced in Eq. (2) may be applied to obtain the discrete representation as $\hat{z}^{(n)} = VQ(z^{(n)})$ 145 and $\hat{z}^{(c)} = VQ(z^{(c)})$ 140. In one or more embodiments, during training, only $\hat{z}^{(c)}$ 140 corresponding to the clean input 105 and the one-hot speaker 155 are used as the conditioner for the WaveNet decoder 150. By explicitly conditioning on the speaker embedding for the decoder, the encoders can focus more on the speaker-independent information and hence can better extract the phoneme contents. Finally, the output 160 of the system corresponds to the audio sequence predicted from the autoregressive WaveNet decoder, which is trained in a teacher forcing approach with the cleaned input as the ground truth (that is, during training, the model receives the ground truth output for time t as an input at time t+1).

3. Embodiments of the Denoising Process

To remove noise from the noisy audio, an aim is to match the latent representations from the noisy and clean inputs. A motivation is that when (i) the decoder is able to generate high-fidelity audios with the clean latent code, i.e., $\hat{z}^{(c)}$, as the conditioner, and (ii) the latent code from the noisy input is close to the one from the clean input, the decoder is expected to output high-fidelity audios as well, by using the noisy latent code, i.e., $\hat{z}^{(n)}$. To design a loss function for matching, in one or more embodiments, the distance of either discrete or continuous latent representations from noisy and clean branches may be computed. However, in one or more embodiments, a hybrid approach may be used by computing the $l^2$ distance between $z^{(c)}$ and $z^{(n)}$ at the time steps when their corresponding codes $\hat{z}^{(c)}$ and $\hat{z}^{(n)}$ differ. Let l denote the number of time steps in the latents and M for the number of output channels, then one has $z^{(c)} \in \mathbb{R}^{l \times M}$, $z^{(n)} \in \mathbb{R}^{l \times M}$, $\hat{z}_i^{(c)} \in \{C_1, C_2, \ldots, C_K\}$, and $\hat{z}_i^{(n)} \in \{C_1, C_2, \ldots, C_K\}$, $\forall i=1, 2, \ldots, l$. Subsequently, the total loss may be represented as a sum of the VQ-VAE loss in Eq. (3) and the matching loss as follows:

$$\mathcal{L}_{total} = -\mathbb{E}_{q_\theta(\hat{z}^{(c)}|x^{(c)})}[\log p_\phi(x^{(c)} | \hat{z}^{(c)})] + \|sg(z^{(c)}) - C_z\|_2^2 + \gamma \|z^{(c)} - sg(C_z)\|_2^2 + \lambda \sum_{i=1}^{l} \mathbb{1}\{\hat{z}_i^{(n)} \neq \hat{z}_i^{(c)}\} \|z_i^{(n)} - z_i^{(c)}\|_2^2. \quad (4)$$

Note that, in one or more embodiments, the matching loss (the last term) in Eq. (4) contributes to the total loss only when the corresponding latent codes are different, leading to more stable training. Furthermore, the loss function in Eq. (4) may be optimized from scratch, and hence avoids the need of pretraining. Another noteworthy point about Eq. (4) (also shown in FIG. 1) is that during training, the decoder is not a function of the noisy input. Consequently, it does not tend to learn any hidden information of the noisy audio throughout the optimization.

Annealing Scheme Embodiments. Directly optimizing with respect to all variables in Eq. (4) can lead to divergence and oscillation very quickly during training. Intuitively speaking, this phenomenon happens because the latent representations for the clean input may not be informative enough to capture the phonetic information at the initial training stages. As a result, the target for the encoder corresponding to the noisy input, i.e., Encoder 2, becomes too difficult to match. Accordingly, in one or more embodiments, to solve this issue, an annealing strategy may be employed. In one or more embodiments, in Eq. (4), $\lambda$ is introduced as a hyperparamter and it is annealed during training by gradually increasing it from 0 to 1. In one or more embodiments, $\lambda$ may be annealed during training by increasing it from 0 (or near 0) to 1 (or near 1) via a sigmoid function.

With such an annealing strategy, the whole network may be initially trained as the VQ-VAE, where the optimization is mainly imposed on the parameters involved in the path corresponding to the clean input, i.e., Encoder1→Vector Quantizer→Decoder, as well as the speaker embedding. In one or more embodiments, when the training for those components becomes stabilized, the matching loss may be gradually added into optimization to minimize the distance between noisy and clean latent representations.

Figure 3:
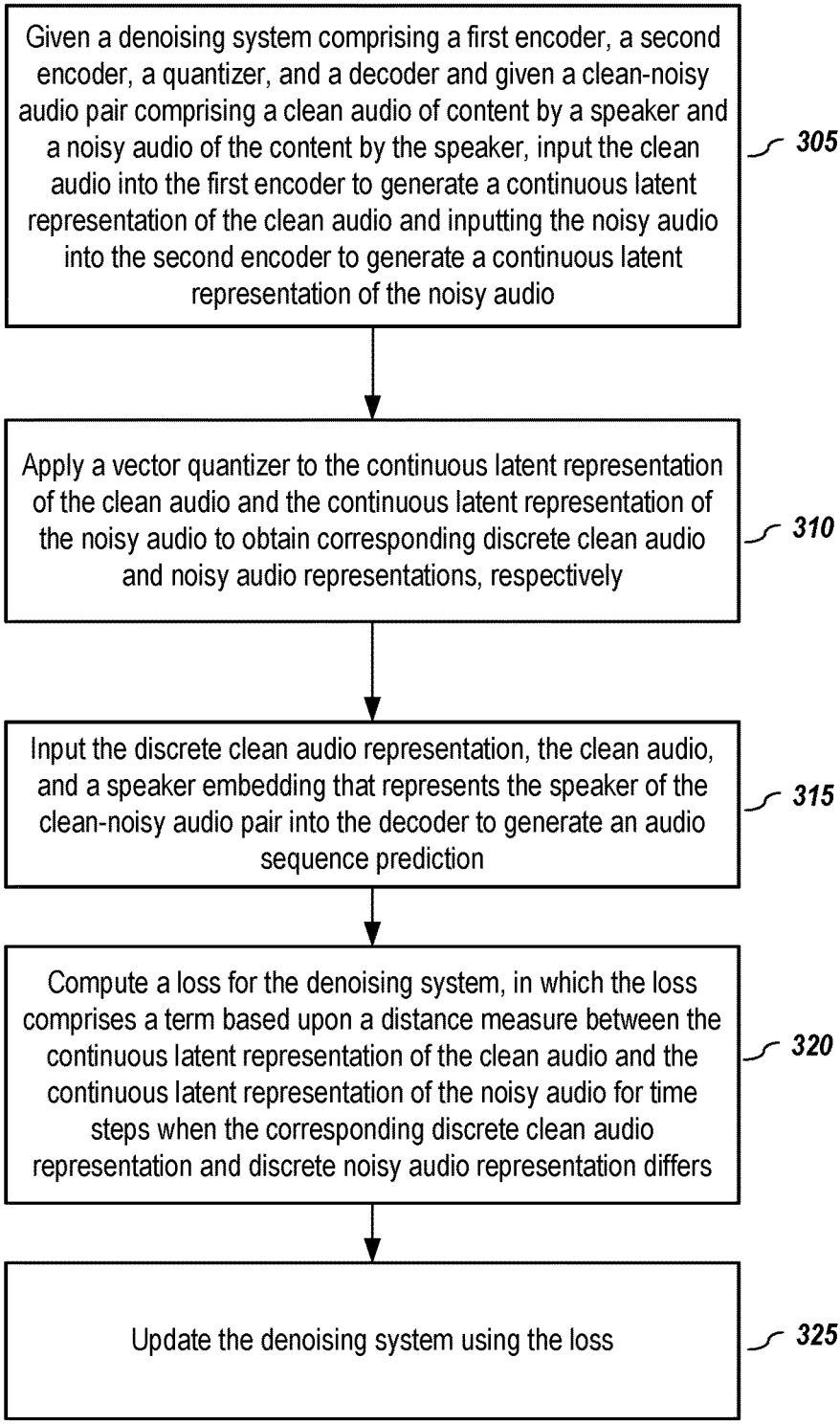
FIG. 3 depicts a method for training a denoising system, according to embodiments of the present disclosure.

FIG. 3 depicts a method for training a denoising system, according to embodiments of the present disclosure. In one or more embodiments, given a denoising system comprising a first encoder, a second encoder, a quantizer, and a decoder and given a clean-noisy audio pair comprising a clean audio of content by a speaker and a noisy audio of the content by the speaker, the clean audio is input (305) into the first encoder to generate a continuous latent representation of the clean audio and the noisy audio is input (305) into the second encoder to generate a continuous latent representation of the noisy audio. A vector quantizer may then be applied (310) to the continuous latent representations of the clean audio and the continuous latent representations of the noisy audio to obtain corresponding discrete clean audio and noisy audio representations, respectively.

In one or more embodiments, the discrete clean audio representation, the clean audio, and a speaker embedding that represents the speaker of the clean-noisy audio pair are input (315) into the decoder to generate an audio sequence prediction output.

In one or more embodiments, a loss for the denoising system is computed (320), in which the loss comprises a term based upon a distance measure (e.g., an $l^2$ distance measure) between the continuous latent representation of the clean audio and the continuous latent representation of the noisy audio for time steps when the corresponding discrete clean audio representation and discrete noisy audio representation differ. The compute loss is used to update (325) the denoising system. In one or more embodiments, the training process may continue until a stop condition has been reached, and the trained denoising system may be output for use in denoising noisy input audio.

4. Inference Embodiments

Figure 4:
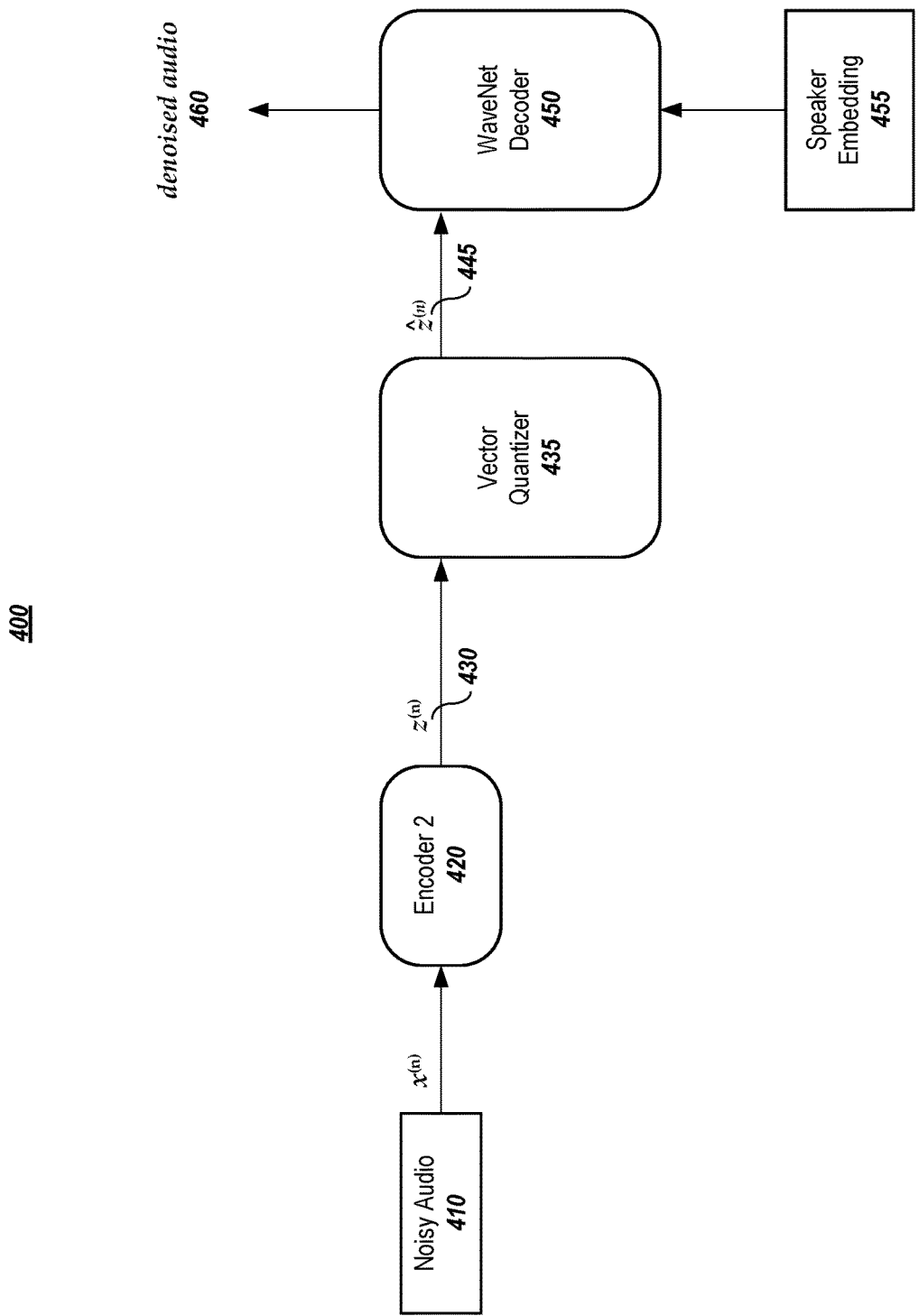
FIG. 4 depicts a trained denoising system, according to embodiments of the present disclosure.

An embodiment of a trained denoising system's forward propagation is illustrated in FIG. 4. During inference, the noisy audio 410 is used as input, and the trained denoising system 400 is used to generate a corresponding denoised audio 460. In one or more embodiments, the phonetic contents are retrieved by passing the noisy audio 410 through the trained encoder 420 and the trained vector quantizer 435. Conditioned on the output 445 from the vector quantizer and speaker embedding 455, the trained WaveNet decoder 450 generates the denoised audio 460. Note that, in one or more embodiments, the current settings assume speakers in the test set should appear in the training set as well; however, it shall be noted that the system may be extended to unseen speakers. On the other hand, conditioning on the speaker embedding for the decoder can facilitate tasks such as voice conversion.

Figure 5:
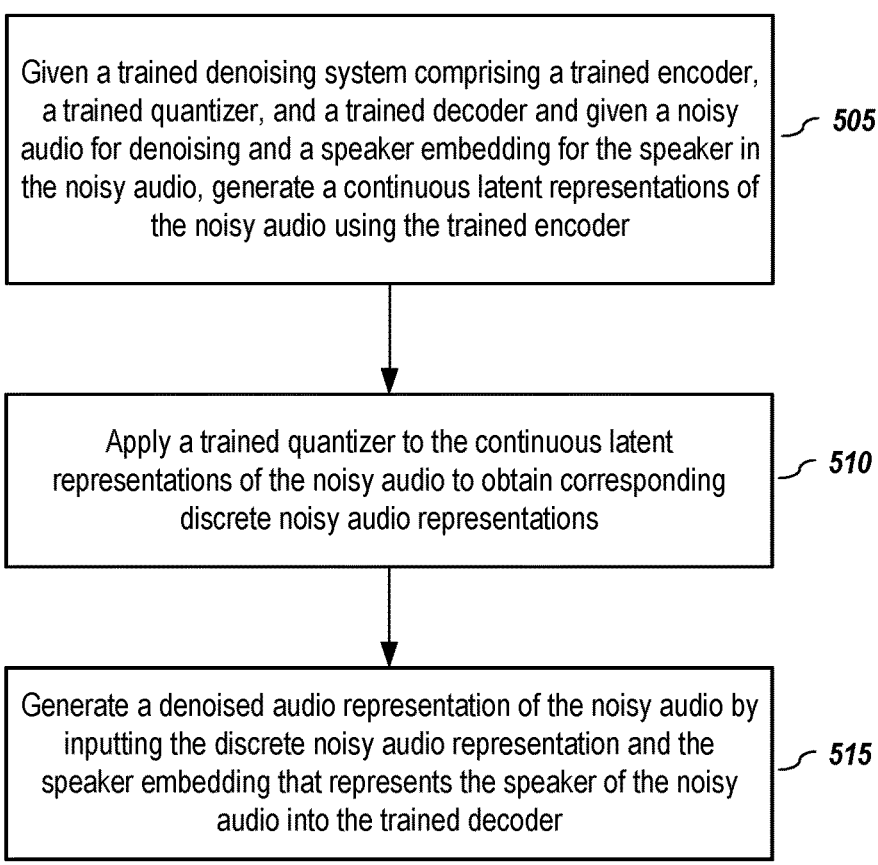
FIG. 5 depicts a method for using a trained denoising system to generate denoised audio, according to embodiments of the present disclosure.

FIG. 5 depicts a method for using a trained denoising system to generate denoised audio, according to embodiments of the present disclosure. In one or more embodiments, given a trained denoising system comprising a trained encoder, a trained quantizer, and a trained decoder and given a noisy audio for denoising and a speaker embedding for the speaker in the noisy audio, a continuous latent representation of the noisy audio is generated (505) using the trained encoder. In one or more embodiments, a trained quantizer is applied (510) to the continuous latent representations of the noisy audio to obtain corresponding discrete noisy audio representations. Finally, a denoised audio representation of the noisy audio may be generated (515) by inputting the discrete noisy audio representations and the speaker embedding that represents the speaker of the noisy audio into the trained decoder.

D. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen and/or video display. The computing system may also include one or more buses operable to transmit communications between the various hardware components.

Figure 6:
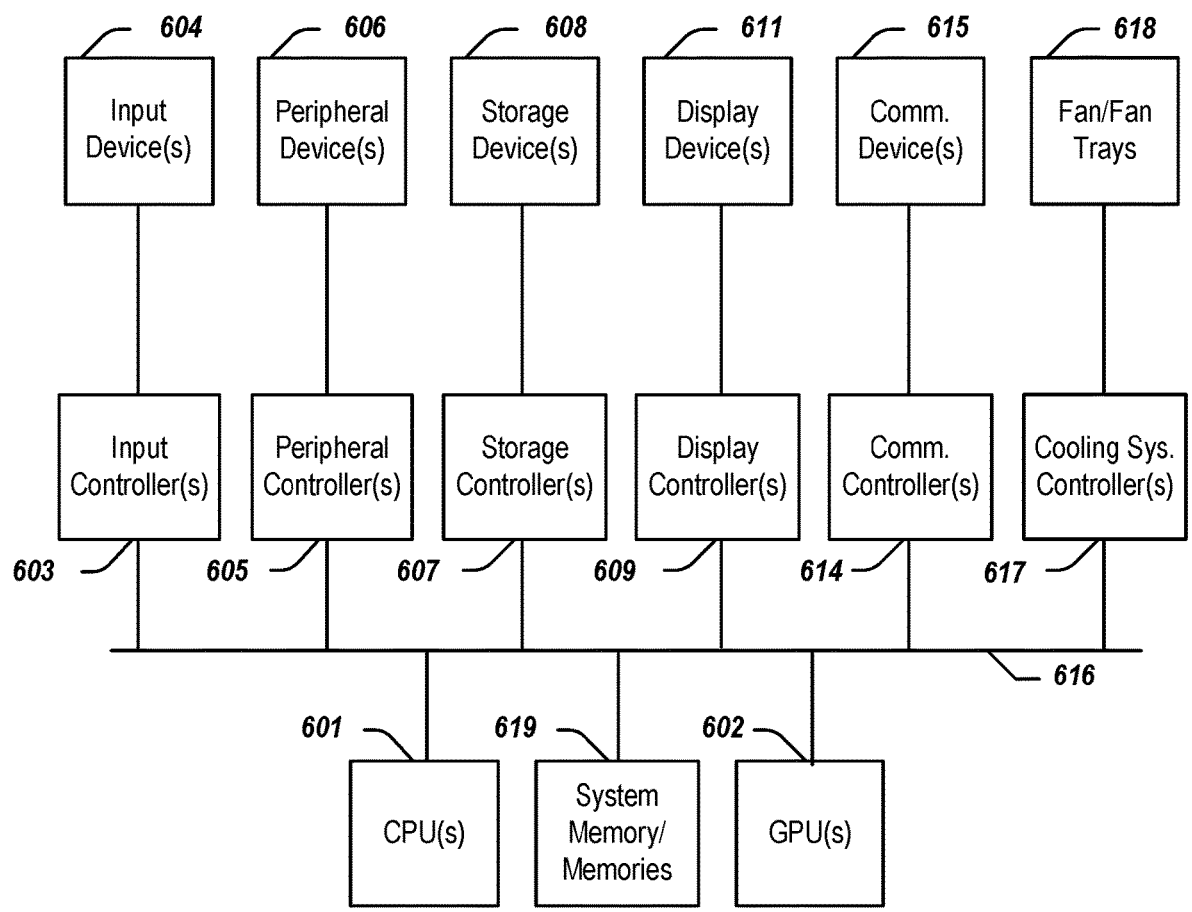
FIG. 6 depicts a simplified block diagram of a computing device/information handling system, according to embodiments of the present disclosure.

FIG. 6 depicts a simplified block diagram of an information handling system (or computing system), according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like, and may also include one or more graphics processing units (GPU) 602 and/or a floating-point coprocessor for mathematical computations. In one or more embodiments, one or more GPUs 602 may be incorporated within the display controller 609, such as part of a graphics card or cards. Thy system 600 may also include a system memory 619, which may comprise RAM, ROM, or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT) display, a thin film transistor (TFT) display, organic light-emitting diode, electroluminescent panel, plasma panel, or any other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 600 comprises one or more fans or fan trays 618 and a cooling subsystem controller or controllers 617 that monitors thermal temperature(s) of the system 600 (or components thereof) and operates the fans/fan trays 618 to help regulate the temperature.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact disc (CD) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as a CD and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training a denoising system comprising:
given a denoising system comprising a first encoder, a second encoder, a quantizer, and a decoder and given a set of one or more clean-noisy audio pairs, in which each clean-noisy audio pair comprises a clean audio of content by a speaker and a noisy audio of the content by the speaker:
for each clean audio from the set of one or more clean-noisy audio pairs:
generating one or more continuous latent representations for the clean audio using the first encoder; and
for each continuous latent representation of the one or more continuous latent representations for the clean audio, generating a corresponding discrete clean audio representation using the quantizer;
for each noisy audio from the set of one or more clean-noisy audio pairs:
generating one or more continuous latent representations for the noisy audio using the second encoder; and
for each continuous latent representation of the one or more continuous latent representations for the noisy audio, generating a corresponding discrete noisy audio representation using the quantizer;
for each clean-noisy audio pair from the set of one or more clean-noisy audio pairs, inputting the discrete clean audio representation or representations, the clean audio, and a speaker embedding that represents the speaker of the clean-noisy audio pair into the decoder to generate an audio sequence prediction;
computing a loss for the denoising system, in which the loss comprises a latent representation matching loss term that, for a time step in which the discrete clean audio representation and the discrete noisy audio representation for a clean-noisy audio pair have different values, is determined using a distance measure between the continuous latent representation of the clean audio and the continuous latent representation of the noisy audio for that time step; and
updating the denoising system using the loss.

2. The computer-implemented method of claim 1 wherein the latent representation matching loss term further comprises:
an annealing term that increases during training from zero or near zero to one or near one.

3. The computer-implemented method of claim 1 wherein the distance measure between the continuous latent representation of the clean audio and the continuous latent representation of the noisy audio comprises:
an $l^2$ distance between the continuous latent representation of the clean audio and the continuous latent representation of the noisy audio.

4. The computer-implemented method of claim 1 wherein the loss comprises:
a decoder term related to loss for the decoder; and
a quantizer term related to loss for the quantizer.

5. The computer-implemented method of claim 1 wherein the quantizer comprises one or more vector-quantized variational autoencoders that convert the one or more continuous latent representations for clean audio to the corresponding one or more discrete clean audio representations and that convert the one or more continuous latent representations for noisy audio to the one or more corresponding discrete noisy audio representations.

6. The computer-implemented method of claim 1 further comprising:
given one or more additional sets of one or more clean-noisy audio pairs:
for each clean audio from the one or more additional sets of one or more clean-noisy audio pairs:
generating one or more continuous latent representations for the clean audio using the first encoder; and
for each continuous latent representation of the one or more continuous latent representations for the clean audio, generating a corresponding discrete clean audio representation using the quantizer;
for each noisy audio from the one or more additional sets of one or more clean-noisy audio pairs:
generating one or more continuous latent representations for the noisy audio using the second encoder; and
for each continuous latent representation of the one or more continuous latent representations for the noisy audio, generating a corresponding discrete noisy audio representation using the quantizer;
for each clean-noisy audio pair from the one or more additional sets of one or more clean-noisy audio pairs, inputting the discrete clean audio representation or representations, the clean audio, and a speaker embedding that represents the speaker of the clean-noisy audio pair into the decoder to generate an audio sequence prediction;
computing a loss for the denoising system, in which the loss comprises a latent representation matching loss term that, for a time step in which the discrete clean audio representation and the discrete noisy audio representation for a clean-noisy audio pair have different values, is determined using a distance measure between the continuous latent representation of the clean audio and the continuous latent representation of the noisy audio for that time step; and
updating the denoising system using the loss; and
responsive to a stop condition being reached, outputting a trained denoising system comprising a trained second encoder, a trained quantizer, and a trained decoder.

7. The computer-implemented method of claim 6 further comprising:
given an inference noisy audio for denoising and an inference speaker embedding for an inference speaker in the inference noisy audio:
generating one or more continuous inference latent representations for the inference noisy audio using the trained second encoder;
generating one or more discrete inference noisy audio representations using the one or more continuous inference latent representations for the inference noisy audio and the trained quantizer; and
generating an inference denoised audio representation of the inference noisy audio by inputting at least some of the one or more discrete inference noisy audio representations and the inference speaker embedding that represents the inference speaker of the inference noisy audio into the trained decoder.

8. The computer-implemented method of claim 1 wherein the decoder is an autoregressive generative model that receives, a conditioner for the decoder, the discrete clean audio representations and the speaker embedding that represents the speaker of the clean audio but not the discrete noisy audio representations for the corresponding noisy audio.

9. A system comprising:
one or more processors; and
a non-transitory computer-readable medium or media comprising one or more sets of instructions which, when executed by at least one of the one or more processors, causes steps to be performed comprising:
given a denoising system comprising a first encoder, a second encoder, a quantizer, and a decoder and given a set of one or more clean-noisy audio pairs, in which each clean-noisy audio pair comprises a clean audio of content by a speaker and a noisy audio of the content by the speaker:
for each clean audio from the set of one or more clean-noisy audio pairs:
generating one or more continuous latent representations for the clean audio using the first encoder; and
for each continuous latent representation of the one or more continuous latent representations for the clean audio, generating a corresponding discrete clean audio representation using the quantizer;
for each noisy audio from the set of one or more clean-noisy audio pairs:
generating one or more continuous latent representations for the noisy audio using the second encoder; and
for each continuous latent representation of the one or more continuous latent representations for the noisy audio, generating a corresponding discrete noisy audio representation using the quantizer;
for each clean-noisy audio pair from the set of one or more clean-noisy audio pairs, inputting the discrete clean audio representation or representations, the clean audio, and a speaker embedding that represents the speaker of the clean-noisy audio pair into the decoder to generate an audio sequence prediction;
computing a loss for the denoising system, in which the loss comprises a latent representation matching loss term that, for a time step in which the discrete clean audio representation and the discrete noisy audio representation for a clean-noisy audio pair have different values, is determined using a distance measure between the continuous latent representation of the clean audio and the continuous latent representation of the noisy audio for that time step; and
updating the denoising system using the loss.

10. The system of claim 9 wherein the latent representation matching loss term further comprises:
an annealing term that increases during training from zero or near zero to one or near one.

11. The system of claim 9 wherein the distance measure between the continuous latent representation of the clean audio and the continuous latent representation of the noisy audio for a time step comprises:
an $l^2$ distance between the continuous latent representation of the clean audio and the continuous latent representation of the noisy audio.

12. The system of claim 9 wherein the loss comprises:
a decoder term related to loss for the decoder; and
a quantizer term related to loss for the quantizer.

13. The system of claim 9 wherein the quantizer comprises one or more vector-quantized variational autoencoders that convert the continuous latent representations for clean audio to the corresponding discrete clean audio representations and that convert the continuous latent representations of noisy audio to the corresponding discrete noisy audio representations.

14. The system of claim 9 wherein the non-transitory computer-readable medium or media further comprises one or more sets of instructions which, when executed by at least one of the one or more processors causes steps to be performed comprising:
given one or more additional sets of one or more clean-noisy audio pairs:
for each clean audio from the one or more additional sets of one or more clean-noisy audio pairs:
generating one or more continuous latent representations for the clean audio using the first encoder; and
for each continuous latent representation of the one or more continuous latent representations for the clean audio, generating a corresponding discrete clean audio representation using the quantizer;
for each noisy audio from the one or more additional sets of one or more clean-noisy audio pairs:
generating one or more continuous latent representations for the noisy audio using the second encoder; and
for each continuous latent representation of the one or more continuous latent representations for the noisy audio, generating a corresponding discrete noisy audio representation using the quantizer;
for each clean-noisy audio pair from the one or more additional sets of one or more clean-noisy audio pairs, inputting the discrete clean audio representation or representations, the clean audio, and a speaker embedding that represents the speaker of the clean-noisy audio pair into the decoder to generate an audio sequence prediction;

computing a loss for the denoising system, in which the loss comprises a latent representation matching loss term that, for a time step in which the discrete clean audio representation and the discrete noisy audio representation for a clean-noisy audio pair have different values, is determined using a distance measure between the continuous latent representation of the clean audio and the continuous latent representation of the noisy audio for that time step; and updating the denoising system using the loss; and responsive to a stop condition being reached, outputting a trained denoising system comprising a trained second encoder, a trained quantizer, and a trained decoder.

15. The system of claim 14 wherein none of the first encoder, the second encoder, the quantizer, and the decoder of the denoising system are pre-trained.

16. A computer-implemented method comprising:

generating one or more continuous latent representations for a clean audio using a first encoder;

for each continuous latent representation of the one or more continuous latent representations for the clean audio, generating a corresponding discrete clean audio representation using a quantizer;

generating one or more continuous latent representations for a noisy audio, which is a noisy version of the clean audio, using a second encoder;

for each continuous latent representation of the one or more continuous latent representations for the noisy audio, generating a corresponding discrete noisy audio representation using the quantizer;

generating an audio sequence prediction by inputting the discrete clean audio representation or representations, the clean audio, and a speaker embedding that represents the speaker of the clean audio into a decoder;

computing a loss for a denoising system, in which the loss comprises a latent representation matching loss term that, for a time step in which the discrete clean audio representation and the discrete noisy audio representation of a clean-noisy audio pair differ, is determined using a distance measure between the continuous latent representation of the clean audio and the continuous latent representation of the noisy audio for that time step; and updating the denoising system using the loss.

17. The computer-implemented method of claim 16 wherein the latent representation matching loss term further comprises:

an annealing term that increases during training from zero or near zero to one or near one.

18. The computer-implemented method of claim 16 wherein the distance measure between the continuous latent representation of the clean audio and the continuous latent representation of the noisy audio comprises:

an $l^2$ distance between the continuous latent representation of the clean audio and the continuous latent representation of the noisy audio.

19. The computer-implemented method of claim 16 wherein the loss comprises:

a decoder term related to loss for the decoder; and a quantizer term related to loss for the quantizer.

20. The computer-implemented method of claim 16 further comprising:

using one or more clean audios and their corresponding noisy audios to train the denoising system; and outputting a trained denoising system.

* * * * *